(12) United States Patent
Gutman

(10) Patent No.: US 10,609,427 B2
(45) Date of Patent: Mar. 31, 2020

(54) GRAPHIC OVERLAY INSERTION

(71) Applicant: WURL INC., Palo Alto, CA (US)

(72) Inventor: Ron Gutman, San Diego, CA (US)

(73) Assignee: WURL INC., Palo Alto, CA (US)

( * ) Notice: Subject to any disclaimer, the term of this patent is extended or adjusted under 35 U.S.C. 154(b) by 0 days.

(21) Appl. No.: 16/168,858

(22) Filed: Oct. 24, 2018

(65) Prior Publication Data

US 2019/0124376 A1    Apr. 25, 2019

Related U.S. Application Data

(60) Provisional application No. 62/577,142, filed on Oct. 25, 2017.

(51) Int. Cl.
| | | |
|---|---|---|
| *H04N 21/234* | (2011.01) | |
| *H04N 21/262* | (2011.01) | |
| *H04N 21/431* | (2011.01) | |
| *H04N 21/235* | (2011.01) | |
| *H04N 21/81* | (2011.01) | |
| *H04N 21/845* | (2011.01) | |

(52) U.S. Cl.
CPC ... *H04N 21/23424* (2013.01); *H04N 21/2358* (2013.01); *H04N 21/26233* (2013.01); *H04N 21/4316* (2013.01); *H04N 21/812* (2013.01); *H04N 21/8146* (2013.01); *H04N 21/8455* (2013.01)

(58) Field of Classification Search
CPC ......... H04N 21/23424; H04N 21/2358; H04N 21/26233; H04N 21/4316; H04N 21/812; H04N 21/8146; H04N 21/8455
See application file for complete search history.

(56) References Cited

U.S. PATENT DOCUMENTS 8,752,113 B1    6/2014 Good et al.
10,231,033 B1 *   3/2019 Bumgarner ........ H04N 21/8547
(Continued)

OTHER PUBLICATIONS

Boreczky et al., "Comparison of video shot boundary detection techniques", Journal of Electronic Imaging, vol. 5, issue 2, pp. 122-128, Apr. 1996.

(Continued)

*Primary Examiner* — Pankaj Kumar
*Assistant Examiner* — Alexander Boyd
(74) *Attorney, Agent, or Firm* — Kligler & Associates Patent Attorneys Ltd

(57) ABSTRACT

A method of adding advertisements to a video stream. The method includes storing for each of a plurality of advertisements, a plurality of versions of the advertisement including same advertisement content with different overlay indications of relative location of the advertisement in an advertisement session. Upon receiving an indication of a video stream, the method includes selecting advertisements for insertion into the video stream, selecting relative positions of the selected advertisements in one or more advertisement sessions in the video stream, identifying for each of the selected advertisements, one of the plurality of versions of the advertisement corresponding to the selected relative position of the advertisement in the one or more advertisement sessions, and providing an indication of the video stream with the identified versions in the selected relative positions.

10 Claims, 1 Drawing Sheet

(56) References Cited

U.S. PATENT DOCUMENTS

| | | | |
|---|---|---|---|
| 10,460,357 B1* | 10/2019 | Bevacqua | G06Q 30/0277 |
| 2002/0178278 A1 | 11/2002 | Ducharme | |
| 2009/0328096 A1* | 12/2009 | Krause | H04N 21/23424 |
| | | | 725/32 |
| 2011/0145856 A1* | 6/2011 | Agarwal | G06Q 30/02 |
| | | | 725/32 |
| 2012/0110619 A1* | 5/2012 | Kilar | G06Q 30/02 |
| | | | 725/34 |
| 2015/0135212 A1 | 5/2015 | Smolic et al. | |
| 2016/0134677 A1 | 5/2016 | Mueller et al. | |

OTHER PUBLICATIONS

Gutman et al., U.S. Appl. No. 16/139,041, filed Sep. 23, 2018.

\* cited by examiner

GRAPHIC OVERLAY INSERTION

CROSS-REFERENCE TO RELATED APPLICATION

This application claims the benefit of U.S. Provisional Patent Application 62/577,142, filed Oct. 25, 2017, which is incorporated herein by reference in its entirety.

FIELD OF THE INVENTION

The present invention relates generally to editing video data, and particularly to adding overlay information to video files.

BACKGROUND

Broadcast channels generally include advertisements for revenue. The viewers, however, may switch to a different channel to avoid the advertisements. In some broadcasting channels, an indication of the duration to the end of a current advertisement session is added to advertisements as an overlay. This indication is assumed to cause the viewers to continue viewing the channel since the time to the end of the advertisement session is known.

U.S. Patent Publication 2002/0178278 to Ducharme, describes receiving a plurality of channels, decoding all of them, inserting graphic overlays on some of the channels as required and re-encoding the channel.

U.S. Pat. No. 8,752,113 to Good describes insertion of graphic overlays after a transc der scale down function for achieving better video quality.

Another method for inserting graphic overlays is by sending the over content separately to a client device, as described by Smolic, U.S. Patent Publication No. 2015/0135212. Although this method eliminates the need to insert the ever-changing promotional overlays, it relies on advanced client devices to do the job and on non-standard distribution protocols.

In some cases, advertisements are personalized separately for each user or for relatively small groups of users. In such cases, the cost of adding overlay indications may be very high and therefore such overlay indications are usually not used with personalized advertisements.

SUMMARY

Embodiments of the present invention that are described hereinbelow provide a method of adding advertisements to a video stream, comprising storing for each of a plurality of advertisements, a plurality of versions of the advertisement including same advertisement content with different overlay indications of relative location of the advertisement in an advertisement session, receiving, by a processor, indication of a video stream, selecting advertisements for insertion into the video stream, selecting relative positions of the selected advertisements in one or more advertisement sessions in the video stream, identifying for each of the selected advertisements, one of the plurality of versions of the advertisement corresponding to the selected relative position of the advertisement in the one or more advertisement sessions, and providing an indication of the video stream with the identified versions in the selected relative positions.

Optionally, receiving the indication of the video stream comprises receiving a manifest file with indications of locations for insertion of advertisements, and wherein providing the indication of the video stream comprises providing the manifest file with pointers to the identified versions instead of the indications of locations for insertion of advertisements. Optionally, the overlay indications of relative location comprise time indications of a time remaining to an end of the advertisement session.

Optionally, the overlay indications of relative location comprise indications of a number of advertisements in a current advertisement session. Optionally, the overlay indications of relative location comprise indications of a number of a current advertisement in a current advertisement session.

There is further provided in accordance with an embodiment of the present invention, an advertisement insertion server, comprising a memory unit storing for each of a plurality of advertisements, a plurality of versions of the advertisement including same advertisement content with different overlay indications of relative location of the advertisement in an advertisement session; and a processor configured to receive an indication of a video stream, to select advertisements for insertion into the video stream, to select relative positions of the selected advertisements in one or more advertisement sessions in the video stream, to identify for each of the selected advertisements, one of the plurality of versions of the advertisement corresponding to the selected relative position of the advertisement in the one or more advertisement sessions, and to provide an indication of the video stream with the identified versions in the selected relative positions.

Optionally, the server is configured to generate in real time, for selected advertisements for which a plurality of versions are not available in the memory unit, one or more versions of the advertisement with overlay indications, by decoding the advertisement, adding the overlay indications and reencoding the advertisement with the added overlay indications into the one or more versions.

Optionally, the server is configured to generate in real time a plurality of versions of the advertisement with overlay indications. Optionally, the processor is configured to select the relative positions of advertisements responsively to information on availability of corresponding versions in the memory unit. Optionally, the server is configured to reencode the advertisement with the added overlay indications into a plurality of versions which differ in the overlay indications. Optionally, the server is configured to utilize values calculated in reencoding a first one of the versions, in reencoding one or more subsequent versions.

The present invention will be more fully understood from the following detailed description of the embodiments thereof, taken together with the drawings in which:

DETAILED DESCRIPTION OF EMBODIMENTS

An aspect of some embodiments of the present invention relates to a method of providing advertisements with an indication of a duration to the end of an advertisement session. The method includes preparing in advance a plurality of versions of the advertisement to which indications of different durations to the end of the advertisement session are overlaid. When advertisements are added to a channel, the specific version of the advertisement with the correct overlay indication is added to the channel. Applicant has identified that the number of different possible duration overlays that may be required is relatively small and that the cost of the additional storage space required for the excess copies is lower than the gain from avoiding real time overlay processing.

Figure 1:
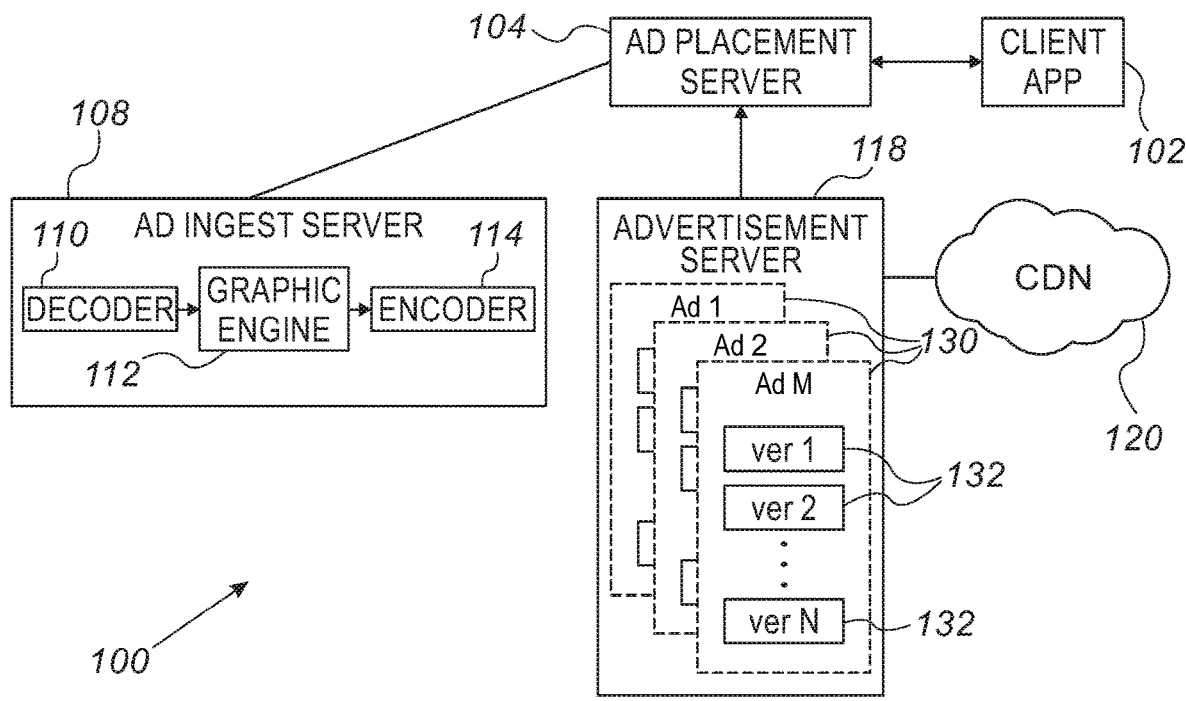
FIG. 1 is a schematic illustration of an advertisement insertion system, in accordance with an exemplary embodiment of the invention.

FIG. 1 is a schematic illustration of an advertisement insertion system. 100, in accordance with an exemplary embodiment of the invention. System 100 includes one or more advertisement placement servers 104, which receive indications of video streams, for example from a client app 102, and provide advertisements for the indicated video streams back to the client app 102 or to any other destination unit designated to receive the video with the advertisements. System 100 further comprises an advertisement server 118, which stores advertisements 130 for placement advertisement placement servers 104. Generally, for each advertisement 130, server 118 stores a plurality of substantially identical versions 132, which differ only in their overlay information.

The overlay information optionally indicates a time remaining to the end of a current advertisement session. The indication optionally includes a time countdown in minutes and/or seconds. Alternatively, the indication states a number of advertisements remaining to the end of the advertisement session, possibly with an indication of the total number of advertisements in the session. Further alternatively or additionally, the indication states the number of the current advertisement in the current advertisement session. For example, if there are four advertisements planned for the current advertisement session and currently the second advertisement is shown, a graphic overlay "2/4" is presented with the advertisement.

The different versions 132 of advertisements 130 stored by server 118 include copies of the advertisement with different overlays, each version 132 having a different overlay that the advertisement may require when placed in an advertisement session. For example, if an advertisement session may include 4, 6 or 8 advertisements and the overlay includes an indication of the current advertisement being displayed and the total number of advertisements, server 118 optionally stores four versions of each advertisement for 4-advertisement sessions, six versions for 6-advertisement sessions and eight versions for 8-advertisement sessions.

In another example, the overlay includes both a timer for the exact duration to the end of the advertisement session at the top right section of the video display and a graphic overlay under the timer with an indication of the form "2/6" indicating the position of current advertisement (second) and the number of advertisements in the session (six). Assuming that all advertisements have the same length, the timer values are determined by the advertisement ordering indication, such that the number of versions is determined by the number of possible advertisement ordering indications in advertisement sessions. In some embodiments, in order to reduce the number of required versions 132, all advertisement sessions have the same number of advertisements and the lengths of the advertisements are all the same. In other embodiments, advertisements are allowed to have different lengths and additional versions 132 are stored in server 118 to accommodate most or all of the expected possible overlays required.

In some embodiments, possibly to reduce the number of stored versions 132, the overlay only includes indication of the time to the end of the advertisement session. In such embodiments, separate versions are required only for the maximal number of advertisements in a session, even if different sessions may have different numbers of advertisements. If only 30 second advertisements are allowed and no more than 8 advertisements are included in a single commercial break, 8 versions 132 of the advertisement are stored by server 118. Version number 1 counts down 29 to 0, version 2 counts down 59 to 30, version 3 counts down 1:29 to 1:00 and so on. If 15 second advertisements are also allowed, then 16 versions are made for the 15 second advertisements inserting graphic overlay counting down 14 to 0, 29 to 15, 44 to 30 and so on, and for the 30 seconds advertisements where 15 seconds are allowed, 16 version are made, 29 to 0, 44 to 15, 59 to 30, 1:14 to 45 and so on.

In some embodiments, to reduce the number of versions 132 stored for each advertisement, some or all of the advertisements are limited to being displayed only in specific positions of advertisement sessions. For example, an advertisement qualified to be presented only as first or last in an advertisement session, has stored versions only for these specific positions.

An advertisement ingest server 108 is configured to add overlay information to new advertisements received by the system. Advertisement ingest server 108 optionally comprises a decoder 110, a graphic engine 112 and an encoder 114. To add overlay information to an advertisement, decoder 110 decodes the advertisement video file, the graphic engine 112 adds the overlay information to the decoded video and then the encoder 114 reencodes the video file of the advertisement.

While FIG. 1 shows separate blocks for different units of advertisement insertion system 100, these blocks represent functional entities which may be implemented by separate corresponding physical units are may be implemented together by one or more processing units. The elements of system 100 are implemented by one or more processors running suitable software and/or by dedicated hardware, firmware or software processors designed to perform specific tasks.

System 100 may include a single Advertisement Placement Server 104 or a plurality of Advertisement Placement Servers 104 to which indications of video streams are distributed, for example by a load balancer (not shown). The received indications of video streams optionally include manifest files which indicate for a corresponding video file or stream, the media segments forming the video stream. For each media segment, the manifest file includes a URL or other pointer indicating the location of the media segment. The corresponding video streams are video on demand streams, linear channels, video files or any other video stream requiring advertisements.

The manifest file optionally includes advertisement markers representing where an advertisement should be inserted. The markers optionally indicate the length of the advertisements to be inserted. Alternatively, the markers indicate dummy media segments which are to be replaced.

Figure 2:
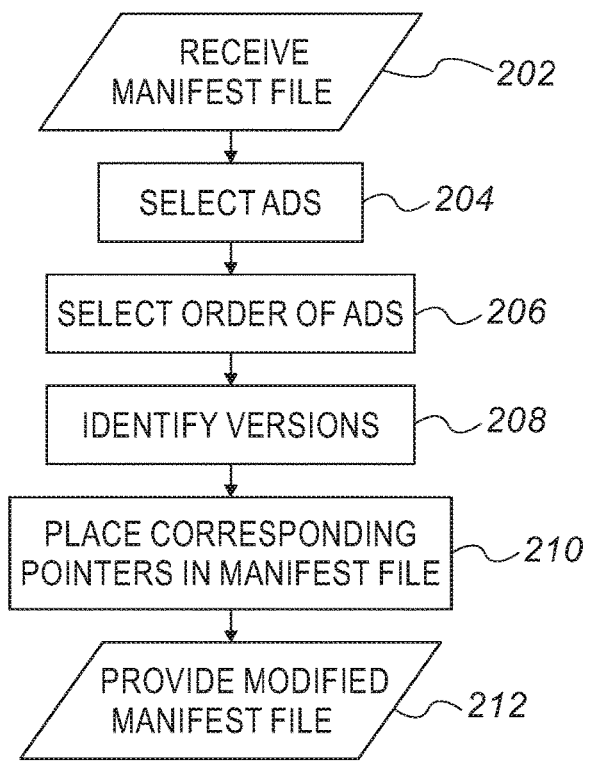
FIG. 2 is flowchart of acts performed by advertisement insertion system in adding advertisements to a video channel, in accordance with embodiments of the present invention.

FIG. 2 is flowchart of acts performed by advertisement insertion system 100 in adding advertisements to a video channel, in accordance with embodiments of the present invention. Upon receiving (202) a manifest file of a video stream, advertisement placement server 104 selects (204) advertisements to be included in the video stream using any suitable method known in the art. The advertisements are optionally selected based on the content of the video stream and/or meta data on the viewers of the video stream. Optionally, the advertisements are selected responsive to the number of advertisement breaks in the video stream and/or the lengths of the advertisement breaks. Further parameters which may be considered in selecting the advertisements include the payment received for displaying the advertisement.

In some embodiments, the advertisements are selected (204) in a video on demand (VOD) system or any other system in which advertisements are adjusted to specific users or to small groups of users. For each subscriber, information on the subscriber, such as a machine type (e.g., screen size) and/or software application used by the subscriber in viewing the video channel, and/or a location of the subscriber (e.g., based on an IP address of the user) are provided to a plurality of advertisement exchanges. The advertisement exchanges provide in response to the subscriber information, suggested advertisements and respective offered payments for displaying the advertisements to the subscriber. The advertisements are selected (204) by advertisement placement server 104 according to the information from the exchanges. In addition to selecting the advertisements to be displayed, advertisement placement server 104 selects (206) an order in which the advertisements are arranged in the advertisement breaks of the video stream. The order of the advertisements is selected using any suitable considerations known in the art, such as any of the considerations discussed above regarding selection of the advertisements.

After selecting the advertisements to be included in the video stream and their arrangement in the advertisement breaks of the video stream, versions 132 of the selected advertisements are identified (208) and pointers to the identified versions are placed (210) in the proper order in the manifest file.

The advertisements are optionally selected (204) from the advertisements 130 stored by advertisement server 118. Alternatively, the advertisements are selected from a set of advertisements listed in the information from the exchanges. In accordance with this alternative, advertisement placement server 104 optionally determines for each received advertisement whether versions 132 of the advertisement are already stored by server 118. For advertisements not having versions 132 available from server 118, the advertisement is optionally passed to advertisement ingest server 108 for preparation of versions 132 in real time, as discussed hereinbelow. The term real time refers herein to acts performed with a short interval (e.g., less than an hour, less than 10 minutes or even less than 30 seconds) from when a human user requests an input dependent on the acts.

The manifest file updated with the pointers to the identified versions 132, is provided (212) to its destination, for example client app 102. In some embodiments, advertisement server 118 provides the advertisements it stores over a content distribution network (CDN) 120. Client app 102 reads the content and advertisement media files from CDN 120. In some embodiments of the invention, advertisement placement server 104 resides on the same physical box as client app 102.

In some embodiments, sufficient versions for each advertisement stored by server 118 are prepared in advance, such that all required versions, can be supplied by server 118. Accordingly, advertisement placement server 104 does not consider the availability of a specific overlay in selecting and arranging the advertlsements. Alternatively, for some advertisements, server 118 stores versions 132 covering only a subset of the possible overlay timing indications that may be required. Optionally, in embodiments in accordance with this alternative, advertisement placement server 104 receives from server 118 information on the availability of overlay versions 132 and accordingly adjusts the selection of advertisements and/or their arrangement in the advertisement sessions, so that only available versions 132 axe required.

The versions 132 are optionally prepared in advance by advertisement ingest server 108. Optionally, advertisements recently received for which overlay versions 132 are not available are not included in advertisement sessions. Alternatively, advertisement placement server 104 passes advertisements for which required overlay versions 132 are not available, to advertisement ingest server 108, for real time generation of an overlay version 132 for immediate use in the current video stream.

Optionally, in real time generation of overlay versions 132, only a single version. 132, the version required for the current video stream is generated. Alternatively, in real time generation of overlay versions 132, since advertisement ingest server 108 is already working on the advertisement, all required versions 132 of the advertisement, are generated. Further alternatively, a decision on the number of versions to be generated in real time is made based on the available resources of advertisement ingest server 108. For example, if advertisement ingest server 108 is currently at a low utilization level, advertisement ingest server 108 prepares all the versions 132 for the advertisements. Otherwise, only a single version or a small subset of versions is prepared. The remaining versions 132 are prepared later offline, or the next time the advertisement is inserted into a video channel.

In some embodiments, encoder 114 takes advantage of the creation of a plurality of versions 132, in performing the reencoding, in order to reduce the processing power required for the reencoding. Optionally, in reencoding versions 132, information from encoding previous versions of the same advertisement is used in performing the encoding of the current version 132. For example, encoder 114 notes the groups of pictures (GOPs) and/or motion vectors selected for one or more previously encoded versions of an advertisement and uses these noted values in encoding a current version of the advertisement.

In other embodiments, versions 132 are not prepared in advance. Instead, each time an overlay version of an advertisement is required, it is first determined whether the required version is available in server 118. If not available, the advertisement is passed to advertisement ingest server 108 for preparation of one or more overlay versions 132 and these versions are stored in server 118 for subsequent use.

The same number of overlay versions 132 is generated for all advertisements managed by server 118. Alternatively, advertisement ingest server 108 decides how many and what versions are created for each new advertisement based on the advertisement duration and predetermined settings.

Versions 132 are generated by encoder 114 in any suitable video format convenient for provision to clients. The versions 132 have suitable bit rates, frame rates and resolutions suitable for insertion into video streams. In some embodiments, server 118 stores multiple copies of advertisements with different bit rates, frame rates and/or resolutions. For each copy of the advertisement having a different bit rate, frame rate and/or resolution, a plurality of versions 132 are generated for different overlay timing indications.

In some embodiments of the invention, server 118 stores the various versions 132 in a compressed format in order to conserve storage space. Optionally, the storage utilizes the redundancy between the different versions 132 of the same advertisement 130 in reducing file sizes.

Encoder 114 and/or server 118 optionally assign versions 132 unique file names for use in the manifest files. Optionally, the names of the versions 132 include the original advertisement file name along with an added version name, for example as a suffix added at the end of the version file name.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method of adding advertisements to a video stream, comprising:
storing in a memory unit, for each of a plurality of advertisements, a plurality of versions of the advertisement including same advertisement content with different overlay indications of relative location of the advertisement in an advertisement session;
receiving, by a processor, indication of a video stream;
selecting advertisements for insertion into the video stream;
selecting relative positions of the selected advertisements in one or more advertisement sessions in the video stream;
identifying for each of the selected advertisements, one of the plurality of versions of the advertisement corresponding to the selected relative position of the advertisement in the one or more advertisement sessions;
providing an indication of the video stream with the identified versions in the selected relative positions; and
generating in real time, for selected advertisements for which a plurality of versions are not available in the memory unit, one or more versions of the advertisement with overlay indications, by decoding the advertisement, adding the overlay indications and reencoding the advertisement with the added overlay indications into the one or more versions.

2. The method of claim 1, wherein receiving the indication of the video stream comprises receiving a manifest file with indications of locations for insertion of advertisements, and wherein providing the indication of the video stream comprises providing the manifest file with pointers to the identified versions instead of the indications of locations for insertion of advertisements.

3. The method of claim 1, wherein the overlay indications of relative location comprise time indications of a time remaining to an end of the advertisement session.

4. The method of claim 1, wherein the overlay indications of relative location comprise indications of a number of advertisements in a current advertisement session.

5. The method of claim 1, wherein the overlay indications of relative location comprise indications of a number of a current advertisement in a current advertisement session.

6. An advertisement insertion server, comprising:
a memory unit storing for each of a plurality of advertisements, a plurality of versions of the advertisement including same advertisement content with different overlay indications of relative location of the advertisement in an advertisement session; and
a processor configured to receive an indication of a video stream, to select advertisements for insertion into the video stream, to select relative positions of the selected advertisements in one or more advertisement sessions in the video stream, to identify for each of the selected advertisements, one of the plurality of versions of the advertisement corresponding to the selected relative position of the advertisement in the one or more advertisement sessions, and to provide an indication of the video stream with the identified versions in the selected relative positions,
wherein the server is configured to generate in real time, for selected advertisements for which a plurality of versions are not available in the memory unit, one or more versions of the advertisement with overlay indications, by decoding the advertisement, adding the overlay indications and reencoding the advertisement with the added overlay indications into the one or more versions.

7. The advertisement insertion server of claim 6, wherein the server is configured to generate in real time a plurality of versions of the advertisement with overlay indications.

8. The advertisement insertion server of claim 6, wherein the processor is configured to select the relative positions of advertisements responsively to information on availability of corresponding versions in the memory unit.

9. The advertisement insertion server of claim 6, wherein the server is configured to reencode the advertisement with the added overlay indications into a plurality of versions which differ in the overlay indications.

10. The advertisement insertion server of claim 9, wherein the server is configured to utilize values calculated in reencoding a first one of the versions, in reencoding one or more subsequent versions.

* * * * *